US008150471B2

(12) United States Patent
Arimoto et al.

(10) Patent No.: US 8,150,471 B2
(45) Date of Patent: Apr. 3, 2012

(54) NETWORK MONITORING SYSTEM

(75) Inventors: Michiharu Arimoto, Shibuya-ku (JP); Hidenobu Seki, Shibuya-ku (JP); Yoshiaki Komoriya, Shibuya-ku (JP); Daiji Sanai, Shibuya-ku (JP); Takashi Mishima, Shibuya-ku (JP)

(73) Assignee: Yamatake Corporation, Tokyo (JP)

( * ) Notice: Subject to any disclaimer, the term of this patent is extended or adjusted under 35 U.S.C. 154(b) by 1261 days.

(21) Appl. No.: 10/682,507

(22) Filed: Oct. 10, 2003

(65) Prior Publication Data
US 2004/0117481 A1 Jun. 17, 2004

(30) Foreign Application Priority Data
Oct. 15, 2002 (JP) ................ P2002-299997

(51) Int. Cl.
*H04M 1/00* (2006.01)
*G06F 15/173* (2006.01)
(52) U.S. Cl. .......... 455/566; 709/223; 709/224
(58) Field of Classification Search ........ 709/223, 709/224
See application file for complete search history.

(56) References Cited

U.S. PATENT DOCUMENTS

| | | | | |
|---|---|---|---|---|
| 5,740,355 A * | 4/1998 | Watanabe et al. | | 714/45 |
| 6,076,106 A * | 6/2000 | Hamner et al. | | 709/223 |
| 6,233,256 B1 | 5/2001 | Dieterich | | |
| 6,351,762 B1 * | 2/2002 | Ludwig et al. | | 709/204 |
| 6,453,345 B2 * | 9/2002 | Trcka et al. | | 709/224 |
| 6,459,682 B1 * | 10/2002 | Ellesson et al. | | 370/235 |
| 6,584,501 B1 * | 6/2003 | Cartsonis et al. | | 709/224 |
| 6,584,502 B1 * | 6/2003 | Natarajan et al. | | 709/224 |
| 6,697,871 B1 * | 2/2004 | Hansen | | 709/234 |
| 7,089,594 B2 * | 8/2006 | Lal et al. | | 726/31 |
| 2002/0169871 A1 * | 11/2002 | Cravo de Almeida et al. | | 709/224 |
| 2003/0009705 A1 * | 1/2003 | Thelander et al. | | 713/340 |
| 2004/0259534 A1 * | 12/2004 | Chaudhari et al. | | 455/414.1 |
| 2005/0021743 A1 * | 1/2005 | Fleig et al. | | 709/224 |
| 2005/0063359 A1 * | 3/2005 | Jagadeesan et al. | | 370/352 |

FOREIGN PATENT DOCUMENTS

| JP | 07-321783 | 12/1995 |
|---|---|---|
| JP | 2002-026935 | 1/2002 |
| JP | 2002-64492 | 2/2002 |

OTHER PUBLICATIONS

Japanese Office Action Dated Nov. 6, 2007 with English Translation.
Canadian Office Action dated Aug. 29, 2008.

* cited by examiner

*Primary Examiner* — Peling Shaw
*Assistant Examiner* — Joiya Cloud
(74) *Attorney, Agent, or Firm* — Dickinson Wright PLLC

(57) ABSTRACT

In a network monitoring system according, first, a data acquisition section acquires a plurality of packets flowing on a network. Then, a data analysis section acquires action explanation information for explaining a single action from the plural packets acquired by the data acquisition section. Then, a display-information generation section displays the single action on the network on the single screen based on the action explanation information acquired by this data analysis section.

27 Claims, 10 Drawing Sheets

| SESSION TABLE | | | | | |
|---|---|---|---|---|---|
| CLIENT | | ACCOUNT | MESSAGE | SERVER | |
| 2000 PRO | HEMP | KAWASAKI | [NG] CREATE FILE FAILURE ¥NEW DOCUMENT. TXT | 2000 SVR | FILE SERVER |
| 2000 PRO | PAPER | HOSHI | CLOSE ¥EMPLOYE | PLAY BACK DATE TIME: 2002/10/08.19.36.03 INDEX68/77 | |
| 2000 PRO | MINT | SATO | [GET INTO] ¥SRVSVC | [OFF] | |
| XP | GARLIC | NAKATA | [NG] LOGON FAILURE NAKATA | 2000 SVR | MAIN |
| NT4 WS | SISO | SUZUKI | [GET INTO] SERVER INFORMATION ¥SRVSVC | SAMBA | SECRET |
| NT4 WS | PARSLEY | OKADA | WRITE ¥CLIENT DATA. XLS | SAMBA | SECRET |
| 2000 PRO | SINAMON | HASHIMOTO | LOGON HASHIMOTO | SAMBA | SECRET |
| NT4 WS | CUMIN | TANAKA | OPEN FILE ¥WORK MANAGEMENT-TANAKA. DOC | 2000 SVR | FILE SERVER |

37: ANALYSIS DATA STORAGE SECTION

| SENDING SOURCE COMPUTER INFORMATION | DESTINATION COMPUTER INFORMATION | USER INFORMATION |
|---|---|---|
| ACTION OBJECT INFORMATION | ACTION INFORMATION | TIME INFORMATION |

FIG. 6

KINDS OF PACKETS

| KIND | PACKET NAME | INCLUDE INFORMATION |
|---|---|---|
| A | CONNECTION PACKET | SENDING SOURCE COMPUTER INFORMATION DESTINATION COMPUTER INFORMATION |
| B | AUTHENTICATION PACKET | USER INFORMATION |
| C | OBJECT SPECIFICATION PACKET | ACTION OBJECT INFORMATION |
| D | COMMAND PACKET | ACTION INFORMATION |
| E | DATA PACKET | DATA |

FIG. 7

SESSION TABLE

| CLIENT | ACCOUNT | MESSAGE | SERVER | |
|---|---|---|---|---|
| 2000 PRO HEMP | KAWASAKI | [NG] CREATE FILE FAILURE ¥NEW DOCUMENT.TXT | 2000 SVR | FILE SERVER |
| 2000 PRO PAPER | HOSHI | CLOSE ¥EMPLOYEE EVALUATION.XLS | SAMBA | SECRET |
| 2000 PRO MINT | SATO | [GET INTO] SHARE LIST ¥SRVSVC | 2000 SVR | DB SERVER |
| XP GARLIC | NAKATA | [NG] LOGON FAILURE NAKATA | 2000 SVR | MAIN |
| NT4 WS SISO | SUZUKI | [GET INTO] SERVER INFORMATION ¥SRVSVC | SAMBA | SECRET |
| NT4 WS PARSLEY | OKADA | WRITE ¥CLIENT DATA.XLS | SAMBA | SECRET |
| 2000 PRO SINAMON | HASHIMOTO | LOGON HASHIMOTO | SAMBA | SECRET |
| NT4 WS CUMIN | TANAKA | OPEN FILE ¥WORK MANAGEMENT-TANAKA.DOC | 2000 SVR | FILE SERVER |

FIG. 9

SESSION TABLE

| CLIENT | ACCOUNT | MESSAGE | SERVER |
|---|---|---|---|
| 2000 PRO / HEMP | KAWASAKI | [NG] CREATE FILE FAILURE ¥NEW DOCUMENT. TXT | 2000 SVR / FILE SERVER |
| 2000 PRO / PAPER | HOSHI | CLOSE ¥EMPLOYE | |
| 2000 PRO / MINT | SATO | [GET INTO] ¥SRVSVC | |
| XP / GARLIC | NAKATA | [NG] LOGON FAILURE NAKATA | 2000 SVR / MAIN |
| NT4 WS / SISO | SUZUKI | [GET INTO] SERVER INFORMATION ¥SRVSVC | SAMBA / SECRET |
| NT4 WS / PARSLEY | OKADA | WRITE ¥CLIENT DATA. XLS | SAMBA / SECRET |
| 2000 PRO / SINAMON | HASHIMOTO | LOGON HASHIMOTO | SAMBA / SECRET |
| NT4 WS / CUMIN | TANAKA | OPEN FILE ¥WORK MANAGEMENT-TANAKA. DOC | 2000 SVR / FILE SERVER |

PLAY BACK
DATE TIME: 2002/10/08.19.36.03 INDEX68/77
OFF

FIG. 11

| SESSION TABLE | | | |
|---|---|---|---|
| CLIENT | ACCOUNT | MESSAGE | SERVER |

FILTER

| | FILTER STRING | ACCOUNT | MESSAGE | RESOURCE | MACHINENAME | OSTYPE | ENABLED | ACCEPT | COLOR | ICON |
|---|---|---|---|---|---|---|---|---|---|---|
| 1 | [NULL] | | | | | | TRUE | FALSE | | ♣ |
| 2 | ADMINISTRATOR | | | | | | TRUE | TRUE | | ♣ |
| 3 | TANAKA | | | | | | TRUE | TRUE | | ♣ |
| 4 | HASHIMOTO | | | | | | TRUE | TRUE | | ♣ |
| 5 | NISHIYAMA | | | | | | TRUE | TRUE | | ♣ |
| 6 | OHARA | | | | | | TRUE | TRUE | | ♣ |
| 7 | YASUE | | | | | | TRUE | TRUE | | ♣ |

[ADD NEW FILTER] [DELETE FILTER]

FILTER NAME: ADMINISTRATOR

ENABLE/DISABLE: ⊙ENABLE ○DISABLE     ACCEPT/DROP: ⊙ACCEPT ○DROP

COLOR: CLRED ▼

ICON: ACCOUNT1.BMP [BROWSE...]

[OK] [CANCEL]

FIG. 12 PRIOR ART

| PACKET NUMBER | SENDING SOURCE DESTINATION | CONTENT OF PACKET |
|---|---|---|
| 1 | C → S | SESSION START REQUEST (PACKET INCLUDES SENDING SOURCE COMPUTER INFORMATION AND DESTINATION COMPUTER INFORMATION) |
| 2 | S → C | RESPONSE TO SESSION START REQUEST |
| 3 | C → S | AUTHENTICATION REQUEST (1) (PACKET INCLUDES USER INFORMATION) |
| 4 | S → C | AUTHENTICATION REQUEST (1) REQUEST CLIENT TO SEND AUTHENTICATION INFORMATION |
| 5 | C → S | AUTHENTICATION REQUEST (2) SEND AUTHENTICATION INFORMATION |
| 6 | S → C | AUTHENTICATION REQUEST (2) SEND BACK AUTHENTICATION RESULT |
| 7 | C → S | CONNECTION REQUEST TO SHARED FOLDER |
| 8 | S → C | RESPONSE TO CONNECTION REQUEST TO SHARED FOLDER |
| 9~18 | C ↔ S | ACQUIRE INFORMATION OF ROOT DIRECTORY OF SHARED FOLDER (FILE LIST AND FILE ATTRIBUTE OF EACH FILE) REPEAT REQUEST AND RESPONSE |
| 19 | C → S | OPEN REQUEST OF ACTION OBJECT FILE (PACKET INCLUDES OBJECT FILE NAME) |
| 20 | S → C | RESPONSE TO OPEN REQUEST OF ACTION OBJECT FILE |
| 21 | C → S | ACQUISITION REQUEST OF FILE STORAGE AREA INFORMATION |
| 22 | S → C | RESPONSE TO ACQUISITION REQUEST OF FILE STORAGE AREA INFORMATION |
| 23 | C → S | WRITING REQUEST INTO FILE (START WRITING INTO OBJECT FILE) |
| 24~33 | C → S | SEND DATA WRITTEN INTO FILE |
| 34 | S → C | RESPONSE TO WRITING REQUEST INTO FILE (SEND BACK RESULT OF WRITING INTO FILE) |
| 35 | C → S | CLOSE REQUEST OF FILE |
| 36 | S → C | RESPONSE TO CLOSE REQUEST OF FILE |

NETWORK MONITORING SYSTEM

The present disclosure relates to the subject matter contained in Japanese Patent Application No.2002-299997 filed on Oct. 15, 2002, which is incorporated herein by reference in its entirety.

BACKGROUND OF THE INVENTION

1. Field of the Invention

The present invention relates to a network monitoring system, a network monitoring method and a network monitoring program for monitoring a communication state on a network.

2. Description of the Related Art

In recent years, mainly in a company, networks such as a LAN (Local Area Network) or a WAN (Wide Area Network) have been constructed and have become widely available. Generally, trouble always accompanies operation of the networks, so that a network monitoring system called a network analyzer for monitoring a network state has been introduced for the purpose of early detection and prevention of the trouble. The network monitoring system is disclosed in, for example, JP-A-2002-64492.

On the other hand, placing, for example, a file server on a network and sharing data in plural clients have been practiced. In the data on this file server, it is necessary to limit access or deletion and rewriting depending to the data. At this time, by the network monitoring system, data packets flowing through the network can be monitored to check which client has accessed the file server.

Here, in a conventional network monitoring system, every packet, the content of data included therein is analyzed and is displayed on a screen. As a result, in a case of storing information for explaining an action in one packet, for example, information indicating what action has been performed with respect to an action object of which client from which client, a communication state can be grasped sufficiently even in the conventional network monitoring system. However, for example, in an SMB (Server Message Block) protocol mainly developed by Microsoft Corporation, action explanation information for explaining one action is divided into a plurality of packets and is sent.

An example of a packet sequence in the SMB protocol is shown in FIG. 12. This example shows an example of a packet sequence of a case where a client makes connection to a shared folder of a server and performs an operation for rewriting a file in the folder. In FIG. 12, packet numbers are numeric characters allocated to individual packets for convenience of explanation and indicate that the packets are sent and received in ascending order. Also, "C" in FIG. 12 shows a client and "S" shows a server. It is apparent from this packet sequence that the action explanation information for explaining one action is divided into 36 packets.

Therefore, in order to grasp one action by the conventional network monitoring system in a network in which such action explanation information for explaining one action is divided into a plurality of packets, a user such as a network supervisor must analyze a communication state after an analysis result of the content of data included in the packets is displayed every packet. As a result, large labor and knowledge are required.

In the conventional network monitoring system thus, there was a problem that large labor and knowledge were required in order to monitor the network in which action explanation information for explaining one action is divided into a plurality of packets.

SUMMARY OF THE INVENTION

The invention is implemented to solve such a problem, and an object of the invention is to provide a network monitoring system, a network monitoring method and a network monitoring program capable of easily monitoring a network in which action explanation information for explaining one action is divided into a plurality of packets.

According to a first aspect of the invention, a network monitoring system monitors a communication state on a network (for example, a network in accordance with the SMB protocol) in which action explanation information for explaining a single action is divided into a plurality of packets. The network monitoring system includes a data acquisition section (for example, a data acquisition section 32 of an embodiment of the invention) for acquiring the plurality of packets flown on the network, a data analysis section (for example, a data analysis section 33 of the embodiment) for acquiring the action explanation information from the plurality of packets acquired by the data acquisition section, and a display-information generation section (for example, a display-information generation section 34 of the embodiment) for generating display information, which is used to display the single action on the network on a single screen on the basis of the action explanation information acquired by the data analysis section. With this configuration, a user can recognize the single action on the single screen. Therefore, monitoring can be performed very easily.

The action explanation information may be defined in advance. Here, the data analysis section may identify kinds of the packets acquired by the data acquisition section and acquire the action explanation information from the packets on the basis of the identified kinds of the packets.

Preferably, the action explanation information includes sending source computer information, destination computer information, and action information.

Also, the network monitoring system may further include an analysis data storage section for storing the action explanation information acquired by the data analysis section. The display-information generation section may regenerate the display information used to play back and display the action explanation information stored by the analysis data storage section in response to a request of a user. As a result, a confirmation of the action on the network can be performed at the most suitable time.

Here, the action explanation information stored by the analysis data storage section may include time information, which corresponds to time at which the single action was performed. The display-information generation section may regenerate the display information used to playback and display the action explanation information stored by the analysis data storage section in accordance with the time information, in response to a request of a user. As a result, the playback display according to an actual state on a time basis can be implemented.

Also, the display-information generation section may continuously play back and display the action explanation information stored by the analysis data storage section at the same time interval to an accuracy of 500 msec as the action was executed, in response to a request of a user. As a result, monitoring operation by the playback display can be performed efficiently. Also, the display-information generation section may extract and generate the display information in accordance with display setting by a user.

According to a second aspect of the invention, a network monitoring method monitors a communication state on a network in which action explanation information for explaining a single action is divided into a plurality of packets. The method includes acquiring the plurality of packets flown on the network, acquiring the action explanation information from the plurality of acquired packets, and generating display information, which is used to display the single action on the network on a single screen on the basis of the acquired action explanation information. By this method, a user can recognize the single action on the single screen. Therefore, monitoring can be performed very easily.

The action explanation information may be defined in advance.

Here, in the acquisition of the action explanation information, kinds of the packets acquired by the packet acquisition may be identified and the action explanation information may be acquired from the packets on the basis of the identified kinds of the packets.

Preferably, the action explanation information includes sending source computer information, destination computer information, and action information.

Also, the network monitoring method may further include storing the acquired action explanation information. In the generation of the display information, the display information may be regenerated. The regenerated display information is used to play back and display the stored action explanation information in response to a request of a user. As a result, a confirmation of the action on the network can be performed at the most suitable time.

Further, the stored action explanation information may include time information, which corresponds to time at which the single action was performed. In the generation of the display information, the display information may be regenerated, the regenerated display information used to play back and display the stored action explanation information in accordance with the time information in response to a request of a user. As a result, the playback display according to an actual state on a time basis can be implemented.

Also, the network monitoring method may further include continuously playing back and displaying the stored action explanation information at the same time interval to an accuracy of 500 msec as the action was executed in response to a request of a user. As a result, monitoring operation by the playback display can be performed efficiently. In the generation of the display information, the display information may be extracted and generated in accordance with display setting by a user.

According to a third aspect of the invention, a network monitoring program monitors a communication state on a network in which action explanation information for explaining a single action is divided into a plurality of packets. The program makes a computer perform a process including acquiring the plurality of packets flown on the network, acquiring the action explanation information from the plurality of acquired packets, and generating display information, which is used to display the single action on the network on a single screen on the basis of the acquired action explanation information. By making the computer perform this program, a user can recognize the single action on the single screen. Therefore, monitoring can be performed very easily.

The action explanation information may be defined in advance.

Here, in the acquisition of the action explanation information, kinds of the packets acquired by the packet acquisition may be identified and the action explanation information may be acquired from the packets on the basis of the identified kinds of the packets.

Preferably, the action explanation information includes sending source computer information, destination computer information, and action information.

Also, the process may further include storing the acquired action explanation information. In the generation of the display information, the display information may be regenerated. The regenerated display information is used to play back and display the stored action explanation information in response to a request of a user. By making the computer to execute the program, check operation of an action on the network can be performed at the optimum time anytime.

Further, the stored action explanation information may include time information, which corresponds to time at which the single action was performed. In the generation of the display information, the display information may be regenerated. The display information is used to play back and display the stored action explanation information in accordance with the time information in response to a request of a user. As a result, the playback display according to an actual state on a time basis can be implemented.

The process may further include continuously playing back and displaying the stored action explanation information at the same time interval to an accuracy of 500 msec as the action was executed in response to a request of a user. As a result, monitoring operation by the playback display can be performed efficiently. Further, in the generation of the display information, the display information may be extracted and generated in accordance with display setting by a user.

BRIEF DESCRIPTION OF THE DRAWINGS

FIG. 6 is a diagram showing an example of kinds of packets flowing on a network to which the network monitoring system according to the invention is applied.

FIG. 7 is a diagram showing a screen display example by the network monitoring system according to the invention.

FIG. 9 is a diagram showing a screen display example of the case of performing a playback function in the network monitoring system according to the invention.

FIG. 11 is a diagram showing a screen display example of setting the contents of display in the network monitoring system according to the invention.

FIG. 12 is a diagram showing an example of a packet sequence.

DETAILED DESCRIPTION OF THE PREFERRED EMBODIMENT

Figure 1:
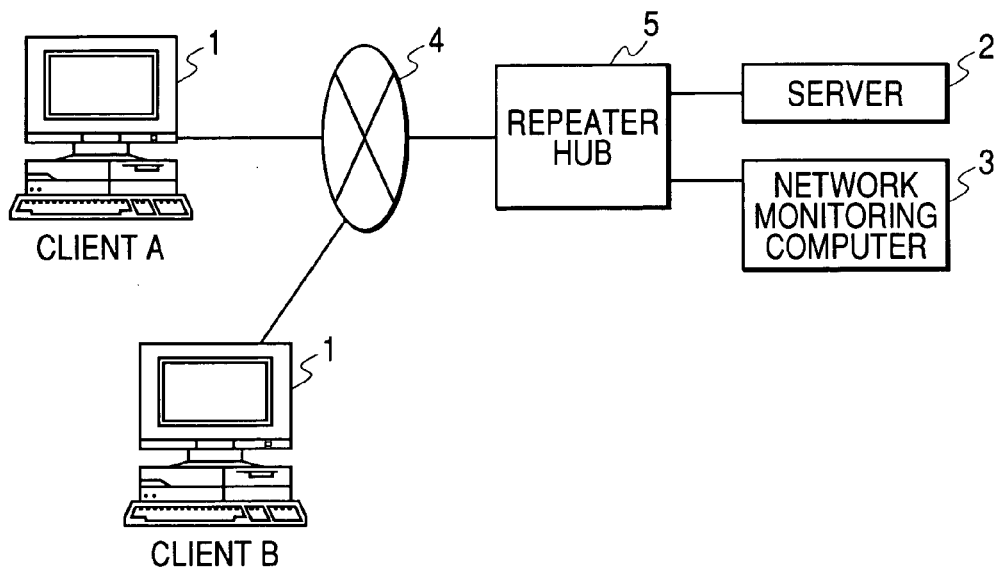
FIG. 1 is a configuration diagram showing a configuration of a network to which a network monitoring system according to the invention is applied.

First, a network configuration to which a network monitoring system according to an embodiment of the invention is applied will be described. FIG. 1 is a configuration diagram showing the network configuration.

As shown in FIG. 1, this network configuration includes a plurality of client computers 1, a server 2, a network monitoring computer 3, a LAN 4, and a repeater hub 5. The client computers 1 are communicably connected to the server 2 and the network monitoring computer 3 through the LAN 4 and the repeater hub 5.

The plurality of client computers 1 are, for example, personal computers (PC) or portable terminals, and each has a hardware configuration such as a CPU (Central Processing Unit), ROM, RAM, a hard disk, a display unit, an input unit and a communication control unit.

The server 2 is, for example, a server such as a file server or a printer server, and is implemented by a server computer or a PC. In the following description, a case where this server 2 is a file server will be described. The server 2 has a hardware configuration such as a CPU, ROM, RAM, a hard disk, a display unit, an input unit and a communication control unit. Incidentally, it is not necessary that the server 2 is one server. The server 2 may be a plurality of servers. In the following example, description will be made by an example of one server.

The network monitoring computer 3, which constructs a network monitoring system, is, for example, a personal computer (PC), and has a hardware configuration such as a CPU, ROM, RAM, a hard disk, a display unit, an input unit and a communication control unit. This network monitoring computer 3 is also called a LAN analyzer. A network monitoring program, which is an application program, is installed in the network monitoring computer 3 according to the embodiment of the invention. This network monitoring computer 3 has a function of monitoring and displaying a communication state on a network. Incidentally, the network monitoring computer 3 may be a dedicated portable terminal integrated with a small display. Detailed configuration and operation will be described below in detail.

The LAN 4 functions as a communication medium on the network. In this example, an SMB protocol is adopted as a communication protocol. In this SMB protocol, as described above, action explanation information for explaining one action is divided into a plurality of packets and is sent.

The server 2 and the network monitoring computer 3 are connected in parallel with the repeater hub 5. Therefore, data, which is sent from and received by the server 2, is sent from and received by the network monitoring computer 3, so that the network monitoring computer 3 can monitor the data, which is sent from and received by the server 2.

Figure 2:
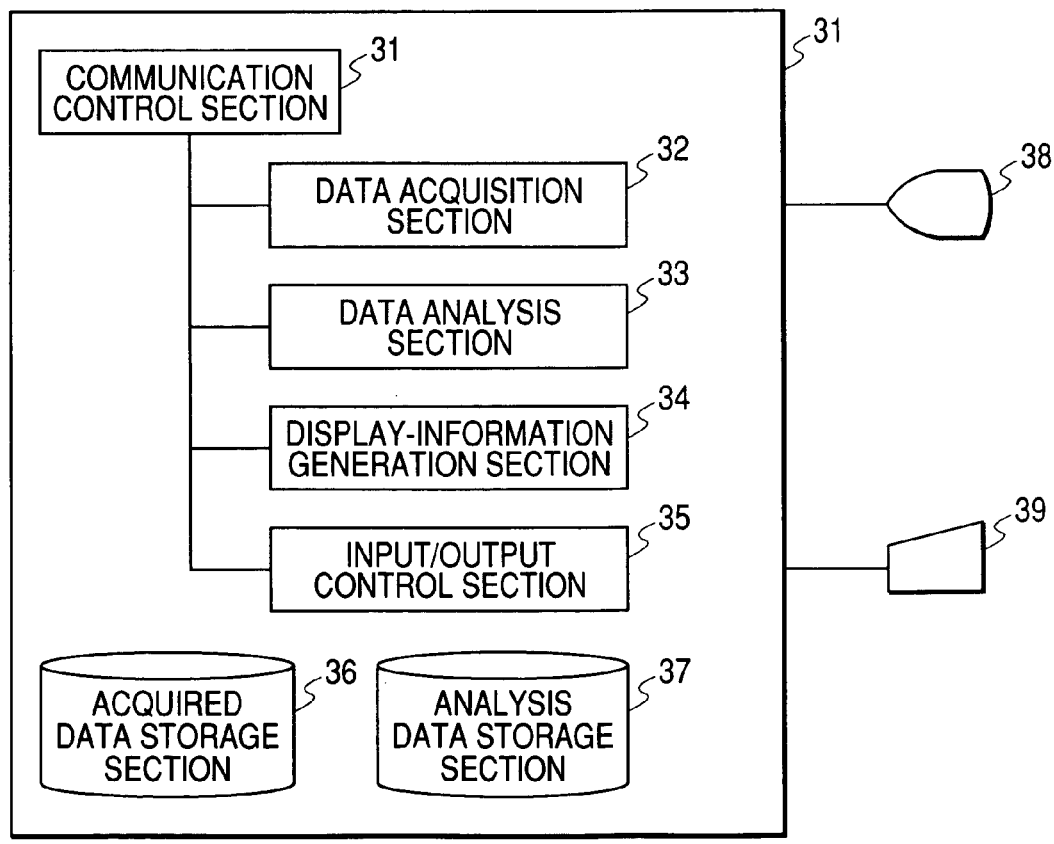
FIG. 2 is a block diagram showing a configuration of a network monitoring computer according to the invention.

Subsequently, a configuration of the network monitoring computer 3 will be described with reference to FIG. 2. As shown in FIG. 2, this network monitoring computer 3 includes a communication control section 31, a data acquisition section 32, a data analysis section 33, a display-information generation section 34, an input/output control section 35, an acquired data storage section 36, an analysis data storage section 37, a display unit 38 and an input unit 39. Incidentally, the network monitoring computer 3 according to the embodiment of the invention may further includes a functional block other than these.

The communication control section 31 controls communication with other computers on the network and particularly in the embodiment of the invention, controls a process for receiving packets similar to packets sent and received between the client 1 and the server 2.

The data acquisition section 32 has a function of acquiring data made of packets similar to packets sent and received between the client 1 and the server 2. Data acquired by the data acquisition section 32 is stored in the acquired data storage section 36.

The data analysis section 33 has a function of making an analysis of packet data acquired by the data acquisition section 32. The data analysis section 33 according to the embodiment of the invention particularly has a function of identifying kinds of the plurality of packets and acquiring action explanation information from the plurality of packets. Data obtained as a result of the analysis by the data analysis section 33 is stored in the analysis data storage section 37.

The display-information generation section 34 has a function of generating display information for displaying the action explanation information obtained by the data analysis by the data analysis section 33 on the display unit 38.

The input/output control section 35 performs control of the display unit 38 and the input unit 39. This display-information generation section 34 has a playback function described later in detail.

The acquired data storage section 36 temporarily stores the data acquired by the data acquisition section 32 and includes a storage device such as a hard disk. This acquired data storage section 36 includes, for example, a cyclic buffer having a certain capacity. For example, the buffer has a storage capacity of about 100 MB and sequentially stores packets. When all areas of the buffer store data, the oldest data on a time basis is overwritten.

The analysis data storage section 37 stores the data obtained as a result of the analysis by the data analysis section 33 and includes a storage device such as a hard disk.

Figures 3, 4:
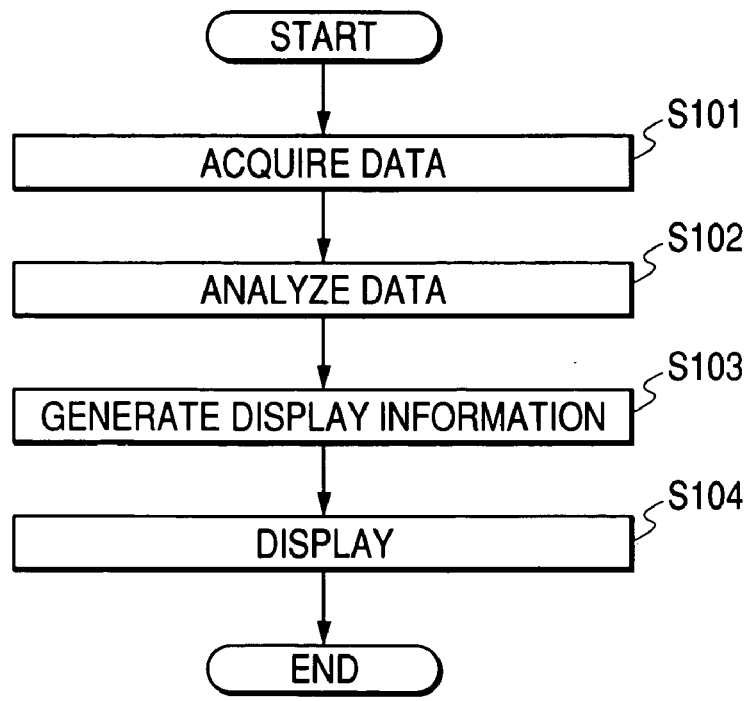
FIG. 3 is a diagram showing a data example of an analysis data storage section of the network monitoring computer according to the invention.
FIG. 4 is a flowchart showing a flow of processing of the network monitoring system according to the invention.

An example of data stored in this analysis data storage section 37 is shown in FIG. 3. As shown in FIG. 3, sending source computer information, destination computer information, user information, action object information, action information and time information are mutually associated with each other and stored in the analysis data storage section 37. Here, the sending source computer information is information for identifying a computer acting as a communication source and is, for example, name information set by a user or an IP address of the computer. The destination computer information is information for identifying a computer acting as a communication destination and is, for example, name information set by a user or an IP address of the computer. The user information is information for identifying a user for performing various process using a computer on a network and is, for example, account information input in a case of logging in to the network. The action object information is information for identifying an object of an action on the network. For example, when the client 1 reads a file "Document.text" in a C drive of the server 2, "the file Document.text in the C drive of the server 2" is action object information. The action information refers to command information such as Read (read), Write (writing), Delete (deletion) and Print (print). The time information is information indicating time at a time when an action was executed.

The display unit 38 is a display device such as a liquid crystal display or a CRT. The input unit 39 is an input device such as a keyboard, a mouse or a mouse pad.

Subsequently, a process flow of the network monitoring system according to the embodiment of the invention will be described.

As shown in a flowchart of FIG. 4, the network monitoring computer 3 acquires packet data flowing on a network by the data acquisition section 32 (S101). Particularly in this example, the network monitoring computer 3 is connected to the repeater hub 5, so that the network monitoring computer 3 acquires a plurality of packets sent and received between the client 1 and the server 2. The acquired packets are stored in the acquired data storage section 36 by the data acquisition section 32.

Next, the network monitoring computer 3 makes a data analysis of the plurality of packets acquired in S101 by the data analysis section 33 (S102). In this data analysis, a kind of each the packet is first identified. Then, information (hereinafter called action explanation information) necessary to explain one action is extracted from the packet whose kind is identified. What kind of information is included in the action explanation information is predefined on a network monitoring program. The action explanation information in this example includes the sending source computer information, the destination computer information, the user information, the action object information, the action information and the time information of an action. This action explanation information is stored in the analysis data storage section 37.

Subsequently, the display-information generation section 34 generates display information based on the data analysis result (S103). Specifically, display information is generated according to a display format specified previously based on the action explanation information generated by the data analysis section 33 and stored in the analysis data storage section 37 (S103). The display format will be described below in detail. The display information generated by the display-information generation section 34 is stored in a storage area (not shown). Incidentally, it is desirable to include at least the sending source computer information, the destination computer information and the action information stored in the analysis data storage section 37 described above in the display information generated by the display-information generation section 34 and to display these information. Further, in addition to these information, any or all of the user information, the action object information and the time information of the action may be included in the display information and are displayed. Thereby, the content of the action can be grasped in further detail.

Then, the input/output control section 35 of the network monitoring computer 3 performs display using the display unit 38 based on the display information generated by the display-information generation section 34 and stored in the predetermined storage area. A display screen example will be described below in detail.

Figure 5:
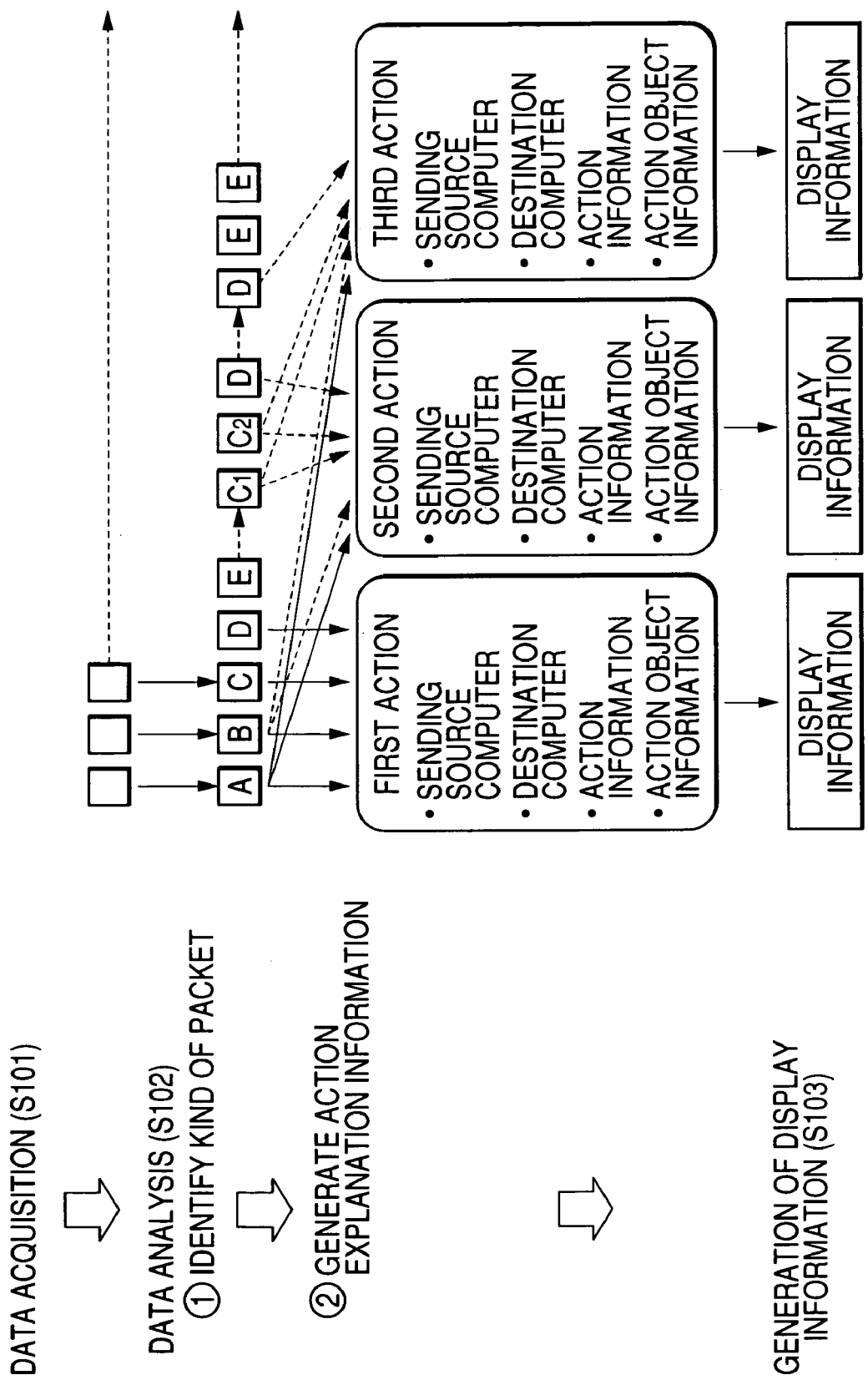
FIG. 5 is an explanatory diagram explaining processing of the network monitoring system according to the invention.

Subsequently, the acquisition of data (S101), the analysis of data (S102) and the generation of display information (S103) will be described based on a simplified example with reference to FIGS. 5 and 6. First, data made of a plurality of packets is acquired (S101).

Then, the analysis of these data is made (S102). In the data analysis, kind of each packet is first identified. In this example, it is assumed that the kinds are sequentially a kind A, a kind B, a kind C, a kind D, a kind E, . . . as shown in FIG. 5. Here, the contents of the kinds A to E of the packets will be described with reference to FIG. 6. As shown in FIG. 6, the kind A indicates a connection packet, and includes the sending source computer information and destination computer information. The kind B indicates an authentication packet, and includes the user information. The kind C indicates an object specification packet, and includes the action object information. The kind D indicates a command packet, and includes the action information. The kind E indicates a data packet, and includes data.

Action explanation information is generated after the kind of each packet is identified. In the example shown in FIG. 5, since the first packet is a packet of the kind A, the sending source computer information and the destination computer information included in the packet are extracted. Since the next packet is a packet of the kind B, the user information included in the packet is extracted. Further, since the subsequent packet is a packet of the kind C, the action object information included in the packet is extracted. In similar manner, the action explanation information is extracted from each packet. Then, from the action explanation information extracted, the action explanation information are associated with each other every action. For example, in the example shown in FIG. 5, if the packets of the kinds A, B, C, and D can be identified, the action explanation information of one action can be acquired. Therefore, the action explanation information corresponding to the first action can be obtained from the first to fourth packets. The action explanation information corresponding to the second action can also be acquired from the plurality of packets associated by arrows shown in FIG. 5. Further, the action explanation information corresponding to the third action can also be acquired from the plurality of packets associated by arrows shown in FIG. 5.

Then, the display information every action is generated based on these action explanation information (S103).

Subsequently, a screen display example of the network monitoring computer according to the embodiment of the invention will be described with reference to FIGS. 7 and 8. FIG. 7 is a diagram displaying actions on a network in a table format. In this screen display example, with regard to a plurality of actions (in this example, eight actions), the action explanation information made of information about clients, accounts, messages and servers is displayed every action. In this example, action explanation information about the actions performed on the network within a predetermined time period is displayed. After a lapse of the predetermined time period since each action has been completed, the action explanation information about each action is erased from the screen display.

For example, with respect to an action displayed in the top column, "2000Pro" showing an OS (Operation System) of a client and "Hemp" showing a client name are displayed as information about the client. Also, a preset icon associated with an account name and "Kawasaki", which is the account name, are displayed as information about an account. Then, "[NG] Create File Failure" showing action information and "¥New Document.txt" showing action object information are displayed as information about a message. Further, "2000SVR" showing an OS of a server and "File Server" showing a server name are displayed as information about the server. By performing such display, a user can very easily grasp that the first action has the content in which the user "Kawasaki" has failed attempting to create the file "New Document.txt" in the server "File Server" operated by the OS of "2000SVR" using the client "Hemp" operated by the OS of "2000Pro".

Figure 8:
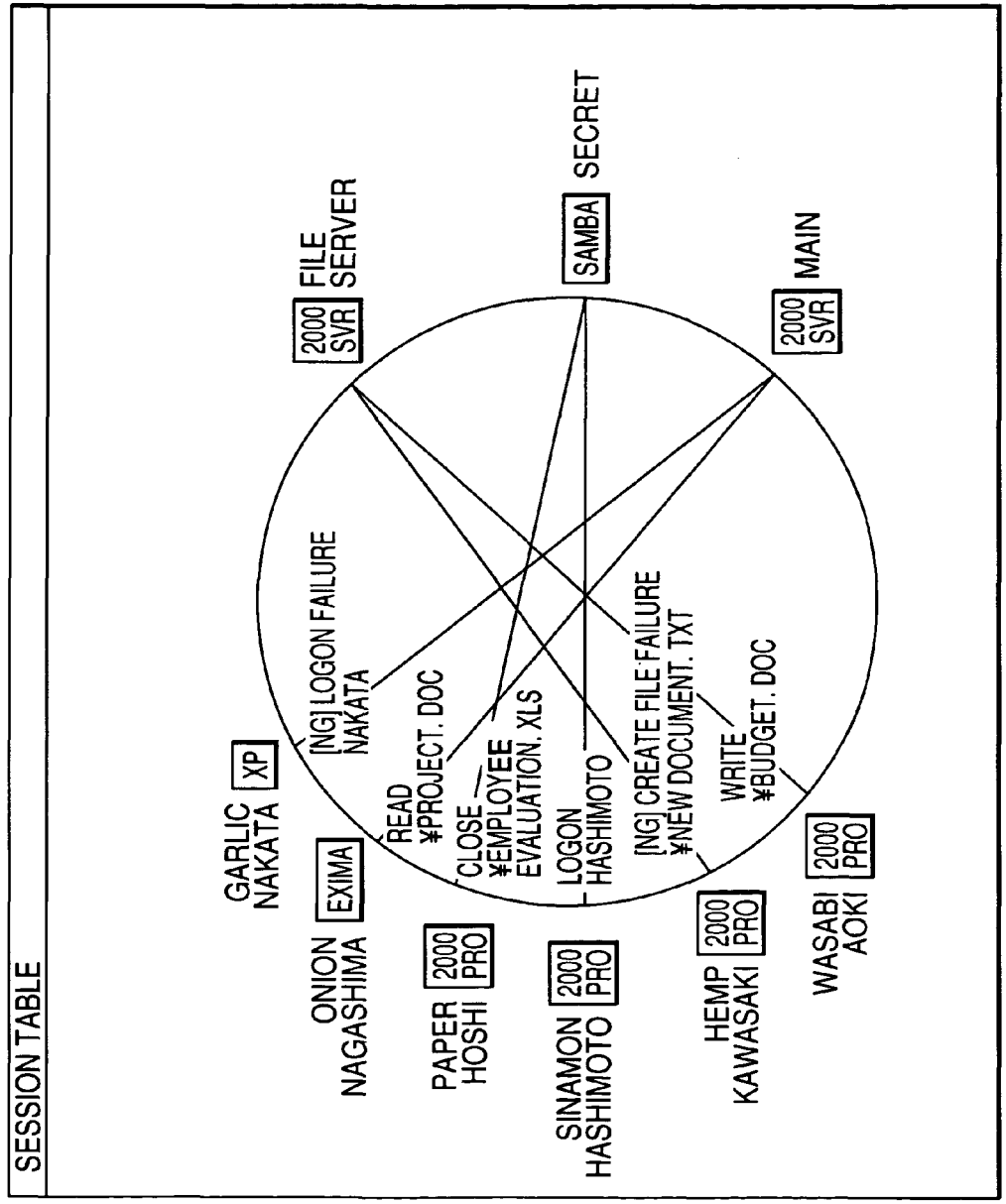
FIG. 8 is a diagram showing a screen display example by the network monitoring system according to the invention.

FIG. 8 is a diagram displaying actions on the network in a graph format. As shown in FIG. 8, a circle is drawn and clients and servers along with the OSes are displayed outside the circle in a separated format. Then, the client and the server, which conduct communication with each other, are connected through a line. Then, the content of an action is displayed in a format associated with this line. Specifically, the content of the action is associated with the line by performing display so that a first character of notation of the content of the action overlaps on this line. While communication between the same client and server continues, the line for making connection between the client and the server remains being displayed and every time a new action occurs, display of the content of the action changes.

Next, a playback function in the network monitoring system according to the embodiment of the invention will be described. The playback function means that an action on the network in the past is played back and displayed on a screen. Specifically, the playback display is performed based on the analysis data stored in the analysis data storage section 37. This function is performed by the display-information generation section 34. In the network monitoring system, when a playback function is selected from a menu and a display item is set, a screen as shown in FIG. 9 is displayed. In this drawing, time of a communication state played back and displayed and an area (window) showing buttons for specifically indicating details of the playback function by a user are displayed. In the example shown in FIG. 9, it is found that actions, which was displayed at 19:36:3, Oct. 8, 2002, is performed. A button for ending the playback function, a button for making a pause, a button for returning to the start, a button for ascending on a time basis, a playback button, a button for advancing to the end and an enlargement button are included in the buttons. When the display-information generation section 34 recognizes that a button displayed on the screen is clicked and selected by a user, the display-information generation section 34 performs processing in response to the clicked and selected button.

Here, in the playback display, each action may be displayed at the same time intervals as an actual action, according to the time information at a time when the actual action is performed. In this case, the display-information generation section 34 performs control so as to display each action at the same time intervals as the actual action based on the time information stored in the analysis data storage section 37. Also, an action can be played back and displayed continuously at the approximately same time intervals in response to a request of a user. The "approximately same time interval" may require a predetermined accuracy, for example, 500 msec. Particularly, in a case of performing quick display and extracting the action in question, the playback display is effective display means.

Figure 10:
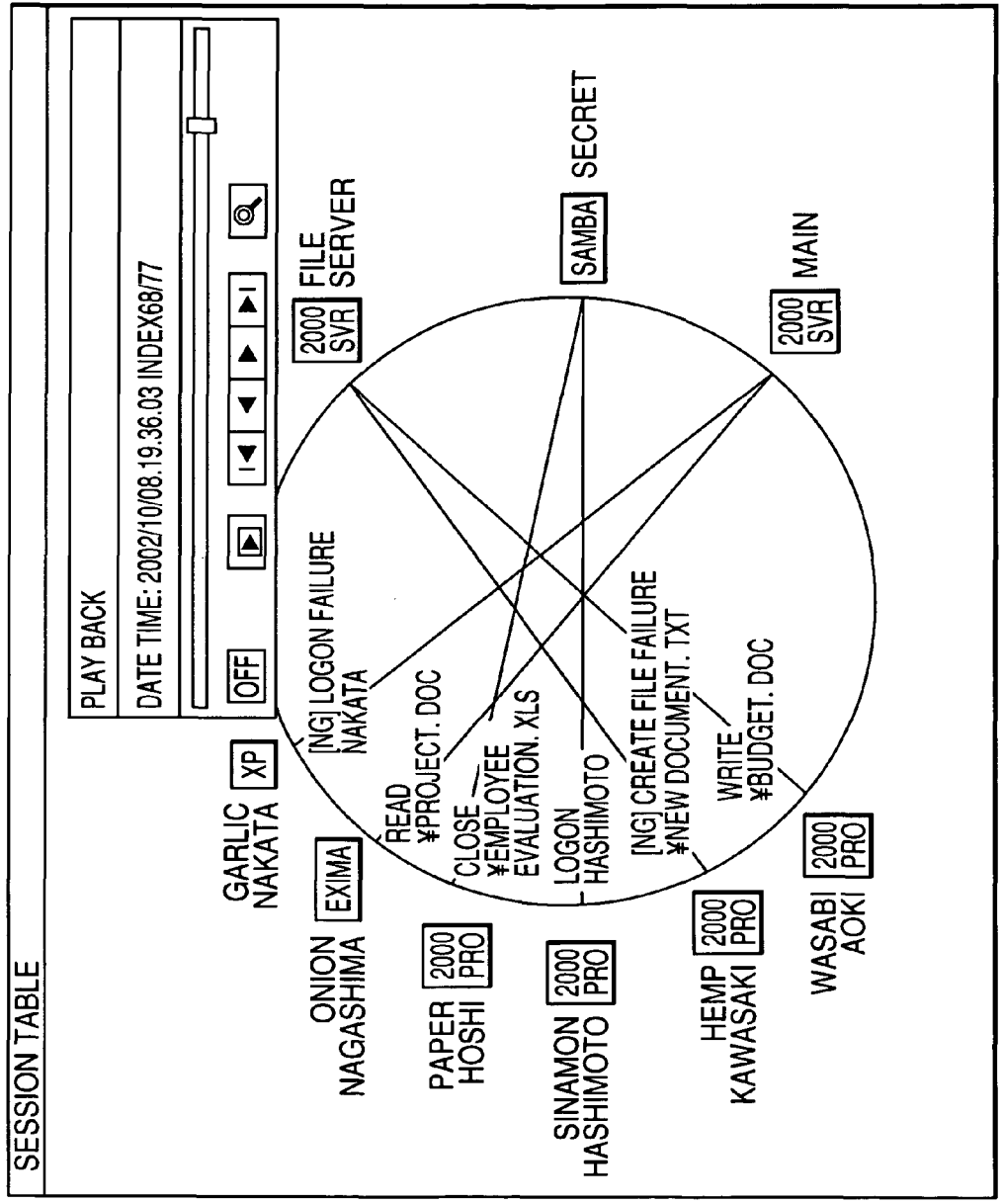
FIG. 10 is a diagram showing a screen display example of the case of performing a playback function in the network monitoring system according to the invention.

FIG. 10 is a diagram showing an area for implementing the playback function on the display screen in the graph format. Since the area is the same as that described with reference to FIG. 9, description is omitted.

Further, in the network monitoring system according to the embodiment of the invention, the content of the screen display can be set. A display example of a setting screen is shown in FIG. 11. As shown in FIG. 11, with regard to an account, a message, a resource, a machine name and an OS, content to be displayed can be selected in the setting screen. Also, a color or an icon of display information can be selected and thereby, highlighting can be performed. The screen display can be set not only at a time of normal monitoring but also in a case of implementing the playback function. The content of setting is stored in a storage area (not shown) in the network monitoring computer 3 and are properly read by the display-information generation section 34.

In the example described above, the example in which the network monitoring system according to the embodiment of the invention is applied to a client/server system has been described. However, the invention is not limited to this example and the network monitoring system can be applied to a peer to peer system.

In the example described above, various programs installed in the storage device such as a hard disk or memory of a computer can be stored in various kinds of storage media and also can be transferred through a communication medium. The storage media include, for example, a flexible disk, a hard disk, a magnetic disk, a magnet-optical disk, CD-ROM, a DVD, a ROM cartridge, a RAM memory cartridge with battery backup, a flash memory cartridge and a nonvolatile RAM cartridge. Also, the communication medium includes a wire communication medium such as a telephone line, a wireless communication medium such as a microwave line, and the Internet is also included.

According to the embodiment of the invention, there can be provided a network monitoring system, a network monitoring method and a network monitoring program capable of easily monitoring a network in which action explanation information for explaining one action is divided into a plurality of packets.

What is claimed is:

1. A network monitoring system that monitors a communication within a network including a plurality of terminals, the terminals including at least a client and a server, the terminals communicating a plurality of action contents with each other, each action content having a group of associated packets, the network monitoring system comprising:
a data acquisition section that acquires a plurality of packets flown on the network;
a data analysis section that analyzes each of the packets to extract the group of associated packets from all the packets and that acquires an action content from the group of associated packets, the data analysis section extracting a plurality of groups of the associated packets and acquiring a plurality of action contents therefrom;
a display-information generation section that generates display information by chronologically aligning the plurality of action contents to correspond to respective times when the action contents are actually communicated; and
a display unit that displays an association graph indicating the terminals within the network and that overlaps additional objects on the association graph the additional objects being generated in accordance with the display, the additional objects being overlapped on the association graph in a chronological order corresponding to the respective times when the action contents are actually communicated,
wherein the additional objects include:
the type of operating system employed by the client,
the type of operating system employed by the server,
an account name of a user accessing the client, and
an icon representing the account name.

2. The network monitoring system according to claim 1, wherein the action content is defined in advance.

3. The network monitoring system according to claim 1, wherein the data analysis section identifies kinds of the packets acquired by the data acquisition section and acquires the action content from the packets on the basis of the identified kinds of packets.

4. The network monitoring system according to claim 1, wherein the action content includes:
sending source computer information and destination computer information included in a connection packet;
user information included in an authentication packet;
action object information included in an object specification packet;
action information included in a command packet; and
data included in a data packet.

5. The network monitoring system according to claim 1, further comprising:
an analysis data storage section that stores the action content acquired by the data analysis section, wherein:
the display-information generation section regenerates information of when the action contents are communicated from the action content stored by the analysis data storage section.

6. The network monitoring system according to claim 5, wherein:
the action content stored by the analysis data storage section includes time information, which corresponds to the time at which a single action occurred; and the display-information generation section determines the time interval that each individual action occurred using the time information stored by the analysis data storage section.

7. The network monitoring system according to claim 5, wherein the display-information generation section continuously regenerates the association graph and overlapping additional objects after each predetermined period, which period is accurate within 500 milliseconds.

8. The network monitoring system according to claim 1, wherein the display-information generation section extracts and generates information of each action occurring on the network in accordance with a display setting set by a user.

9. A network monitoring method for monitoring a communication within a network including a plurality of terminals, the terminals including at least a client and a server, the terminals communicating a plurality of action contents with each other, each action content having a group of associated packets, the method comprising:

acquiring a plurality of packets flown on the network;

analyzing each of the packets to extract the group of associated packets from all the packets and acquiring an action content from the group of associated packets, and extracting a plurality of groups of the associated packets and acquiring a plurality of action contents therefrom;

generating display information by chronologically aligning the plurality of action contents to correspond to respective times when the action contents are actually communicated; and displaying an association graph indicating the terminals within the network and overlapping additional objects on the association graph, the additional objects being generated in accordance with the display, the additional objects being overlapped on the association graph in a chronological order corresponding to the respective times when the action contents are actually communicated, wherein the additional objects include:
the type of operating system employed by the client,
the type of operating system employed by the server,
an account name of a user accessing the client, and
an icon representing the account name.

10. The network monitoring method according to claim 9, wherein the action content is defined in advance.

11. The network monitoring method according to claim 9, wherein in the acquisition of the action content, kinds of the packets acquired by the packet acquisition are identified and the action content is acquired from the packets on the basis of the identified kinds of packets.

12. The network monitoring method according to claim 9, wherein the action content includes:
sending source computer information and destination computer information included in a connection packet;
user information included in an authentication packet;
action object information included in an object specification packet;
action information included in a command packet; and
data included in a data packet.

13. The network monitoring method according to claim 9, further comprising:
storing the acquired action content, wherein:
information of when the action contents are communicated is regenerated from the stored action content.

14. The network monitoring method according to claim 13, wherein:
the stored action content includes time information, which corresponds to the time at which a single action occurred; and
the time interval that each individual action occurred is determined using the stored time information.

15. The network monitoring method according to claim 13, further comprising continuously regenerating the association graph and overlapping additional objects after each predetermined period, which period is accurate within 500 milliseconds.

16. The network monitoring method according to claim 9, wherein information of each action occurring on the network is extracted and generated in accordance with a display setting set by a user.

17. A network monitoring program recorded on a non-transitory computer readable storage medium and executable by a computer, the program making the computer monitor a communication within a network including a plurality of terminals, the terminals including at least a client and a server, the terminals communicating a plurality of action contents with each other, each action content having a group of associated packets, and perform a process comprising:

acquiring a plurality of packets flown on the network;

analyzing each of the packets to extract the group of associated packets from all the packets and acquiring an action content from the group of associated packets, and extracting a plurality of groups of the associated packets and acquiring a plurality of action contents therefrom;

generating display information by chronologically aligning the plurality of action contents to correspond to respective times when the action contents are actually communicated; and displaying an association graph indicating the terminals within the network and overlapping additional objects on the association graph, the additional objects being generated in accordance with the display, the additional objects being overlapped on the association graph in a chronological order corresponding to the respective times when the action contents are actually communicated, wherein the additional objects include
the type of operating system employed by the client,
the type of operating system employed by the server,
an account name of a user accessing the client, and
an icon representing the account name.

18. The network monitoring program according to claim 17, wherein the action content is defined in advance.

19. The network monitoring program according to claim 17, wherein in the acquisition of the action content, kinds of the packets acquired by the packet acquisition are identified and the action content is acquired from the packets on the basis of the identified kinds of packets.

20. The network monitoring program according to claim 17, wherein the action content includes:
sending source computer information and destination computer information included in a connection packet;
user information included in an authentication packet;
action object information included in an object specification packet;
action information included in a command packet; and
data included in a data packet.

21. The network monitoring program according to claim 17, wherein:
the process further comprises storing the acquired action content; and information of when the action contents are communicated is regenerated from the stored action content.

22. The network monitoring program according to claim 21, wherein:
the stored action content includes time information, which corresponds to the time at which a single action occurred; and
the time interval that each individual action occurred is determined using the stored time information.

23. The network monitoring program according to claim 21, wherein the process further comprises continuously regenerating the association graph and overlapping additional objects after each predetermined period, which period is accurate within 500 milliseconds.

24. The network monitoring program according to claim 17, wherein information of each action occurring on the network is extracted and generated in accordance with a display setting set by a user.

25. The network monitoring system of claim 1, wherein the display unit displays a graphical representation of a communication connection between the client and the server.

26. The network monitoring method of claim 9, further comprising displaying a graphical representation of a communication connection between the client and the server.

27. The network monitoring program of claim 17, further comprising displaying a graphical representation of a communication connection between the client and the server.

* * * * *